US012640083B2

(12) United States Patent
Moon et al.

(10) Patent No.: US 12,640,083 B2
(45) Date of Patent: May 26, 2026

(54) SYSTEM AND METHOD FOR SETTING BIAS VOLTAGE

(71) Applicant: Samsung Display Co., LTD., Yongin-si (KR)

(72) Inventors: Chang Yun Moon, Yongin-si (KR); Hun Bae Kim, Yongin-si (KR); In Jun Bae, Yongin-si (KR); Ga Ram Kim, Yongin-si (KR); Woon Yong Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/669,799

(22) Filed: May 21, 2024

(65) Prior Publication Data

US 2025/0124849 A1 Apr. 17, 2025

(30) Foreign Application Priority Data

Oct. 12, 2023 (KR) ........................ 10-2023-0136135

(51) Int. Cl.
*G09G 3/30* (2006.01)

(52) U.S. Cl.
CPC ......... *G09G 3/30* (2013.01); *G09G 2310/027* (2013.01); *G09G 2320/0233* (2013.01); *G09G 2320/0247* (2013.01); *G09G 2330/028* (2013.01)

(58) Field of Classification Search
CPC ............... G09G 3/30; G09G 2310/027; G09G 2320/0233; G09G 2320/0247; G09G 2330/028; G09G 3/3208; G09G 2300/0426; G09G 2300/0809; G09G 2360/16
See application file for complete search history.

(56) References Cited

U.S. PATENT DOCUMENTS

| | | | | |
|---|---|---|---|---|
| 11,056,043 | B2 | 7/2021 | Oh et al. | |
| 11,468,839 | B2 | 10/2022 | Sang et al. | |
| 2020/0320914 | A1* | 10/2020 | Lee | G09G 3/006 |
| 2022/0076627 | A1* | 3/2022 | Kim | G09G 3/3233 |
| 2025/0069555 | A1* | 2/2025 | Kim | G09G 3/3233 |

FOREIGN PATENT DOCUMENTS

| | | | |
|---|---|---|---|
| KR | 1020200142645 | A | 12/2020 |
| KR | 1020220022335 | A | 2/2022 |

* cited by examiner

*Primary Examiner* — Chanh D Nguyen
*Assistant Examiner* — Gloryvid Figueroa-Gibson
(74) *Attorney, Agent, or Firm* — CANTOR COLBURN LLP

(57) ABSTRACT

Embodiments of the present disclosure provide a method for setting, by a computing device, a bias voltage of a driver integrated circuit that supplies voltage to a display panel. The method includes: selecting one of a plurality of pre-stored scenarios based on a change in a flicker index and applying a bias voltage to the display panel according to a level based on the selected scenario, and recording, to the driver integrated circuit, a level of the bias voltage which corresponds to a minimum value in a fitted quadratic function. According to a system and a method for setting the bias voltage according to embodiments of the present disclosure, the level of the bias voltage that minimizes the flicker phenomenon by minimizing a change in luminance of the display panel based on the bias voltage can be calculated through minimal measurements.

19 Claims, 8 Drawing Sheets

1000

<Scenario 1>

<Scenario 2>

1000

SYSTEM AND METHOD FOR SETTING BIAS VOLTAGE

This application claims priority to Korean Patent Application No. 10-2023-0136135 filed on Oct. 12, 2023, and all the benefits accruing therefrom under 35 U.S.C. § 119, the content of which in its entirety is herein incorporated by reference.

BACKGROUND

1. Field

Embodiments of the present disclosure relate to a system and method for setting a bias voltage.

2. Description of the Related Art

With the development of information technology, the importance of a display device, which is a connection medium between users and information, has been highlighted. Therefore, the use of a display device such as a liquid crystal display device, an organic light emitting diode display device, and the like has been increasing.

Images of various content can be displayed through a display device. To this end, some display devices may provide smooth screen transitions to users of the display devices by displaying images at a high refresh rate, or the display devices may reduce power consumption by displaying images at a low refresh rate.

In some cases, when a display device displays an image at a low refresh rate, a constant voltage may be continuously applied to the transistor disposed on the display panel. As a result, the hysteresis characteristics of the transistor may change. When the hysteresis characteristics of the transistor change, the current driving ability of the transistor may change, and as a result, the image may be perceived as flickering by the user of the display device. As described herein, the phenomenon in which the image is perceived as flickering may be referred to as the flicker phenomenon.

To alleviate (or prevent) the flicker phenomenon, some approaches may apply a bias voltage to the transistor to alleviate changes in the hysteresis characteristics of the transistor. However, the level of the bias voltage that can minimize the flicker phenomenon may differ for each display panel. Techniques are desired for measuring the change in luminance of a display panel based on the bias voltage and calculating an appropriate level of bias voltage by minimizing the number of times for measuring the change in luminance of the display panel.

SUMMARY

Embodiments of the present disclosure provide a system for setting a bias voltage that can calculate, through minimal measurement, a level of the bias voltage that minimizes the flicker phenomenon by minimizing a change in luminance of the display panel based on the bias voltage.

Embodiments of the present disclosure provide a method for setting, by a computing device, a bias voltage of a driver integrated circuit that supplies voltage to a display panel, including: applying the bias voltage to the display panel according to a first level; receiving, from the display panel, a first flicker index corresponding to the bias voltage according to the first level; applying the bias voltage to the display panel according to a second level different from the first level; receiving a second flicker index corresponding to the bias voltage applied according to the second level; calculating a change in flicker index based on a change (e.g., an increase) in the level of the bias voltage; selecting one of a plurality of pre-stored scenarios based on the calculated change in the flicker index and, based on the selected scenario, applying the bias voltage to the display panel according to a third level; receiving a third flicker index corresponding to the bias voltage applied according to the third level; fitting a quadratic function based on the bias voltages at the first level to the third level and the first flicker index to the third flicker index; and recording, to the driver integrated circuit, a level of the bias voltage which corresponds to a minimum value in the fitted quadratic function.

Fitting the quadratic function may include, if the third flicker index is a value between the first flicker index and the second flicker index, fitting the quadratic function based only on the bias voltages applied according to the first to third level and the first flicker index to the third flicker index.

The method may include if, in the calculating the change in the flicker index based on the change (e.g., the increase) in the level of the bias voltage, the flicker index increases as the level of the bias voltage increases, applying the bias voltage according to the third level, which is smaller than the bias voltages applied according to the first level and the second level, to the display panel based on a first scenario of the plurality of pre-stored scenarios.

The method may include if, in the calculating the change in the flicker index based on the change (e.g., the increase) in the level of the bias voltage, if the flicker index decreases as the level of the bias voltage increases, applying the bias voltage according to the third level, which is greater than the bias voltages according to the first level and the second level, to the display panel based on a second scenario of the plurality of pre-stored scenarios.

The method for setting the bias voltage may further includes if the third flicker index is smaller than the first and second flicker indexes, applying the bias voltage to the display panel according to a fourth level greater than the third level based on a third scenario of the plurality of pre-stored scenarios; and receiving a fourth flicker index corresponding applying to the bias voltage according to the fourth level.

Fitting the quadratic function may include further fitting the quadratic function based on the bias voltage according to the fourth level and the fourth flicker index.

The bias voltage applied according to the second level may be greater than the bias voltage applied according to the first level.

Applying the bias voltage to the display panel according to the first level may include outputting, by the computing device, a bias voltage control signal to the voltage controller. Applying the bias voltage to the display panel according to the first level may be by the voltage controller, based on the input bias voltage control signal.

The method may include outputting, by a luminance meter, the first flicker index generated based on a change in luminance of the display panel while the bias voltage according to the first level is applied to the display panel, Receiving the first flicker index may include receiving, by the computing device, the first flicker index from the luminance meter.

Embodiments of the present disclosure provides a system for setting a bias voltage, the system including: a voltage controller configured to apply a bias voltage based on a bias voltage control signal; a display panel in which a plurality of sub-pixels to which the bias voltage is commonly applied are disposed, where a change in luminance associated with the display panel varies based on a level of the bias voltage applied to the plurality of sub-pixels; a luminance meter configured to capture one or more images of the display panel and generate a flicker index based on a change in luminance of the display panel determined based on the one or more images; driver integrated circuit; and a computing device. The computing device is configured to store a plurality of scenarios in a memory, output the bias voltage control signal, receive the flicker index, calculate the change in the flicker index based on the change (e.g., the increase) in the level of the bias voltage, change and output the bias voltage control signal according to one of the plurality of scenarios, based on the change of the calculated flicker index, fit a quadratic function based on the level of the bias voltage and the flicker index corresponding to the level of the bias voltage; and record, to the driver integrated circuit, a level of the bias voltage which corresponds to a minimum value in the quadratic function fitted by the computing device.

The voltage controller may output the bias voltage according to a first level and output the bias voltage according to a second level, based on the bias voltage control signal. The computing device may receive a first flicker index corresponding to the bias voltage output according to the first level and a second flicker index corresponding to the bias voltage output according to the second level from the luminance meter. The computing device may calculate a change in the flicker index based on the change (e.g., the increase) in the level of the bias voltage, based on the bias voltages according to the first level and the second level, the first flicker index, and the second flicker index.

The computing device may select one of the plurality of pre-stored scenarios based on the change in the flicker index, and, based on the selected scenario, change and output the bias voltage control signal such that a bias voltage according to a third level is applied to the display panel according to a third level.

If the third flicker index corresponding to applying the bias voltage according to the third level is a value between the first flicker index and the second flicker index, the computing device may fit the quadratic function based only on the bias voltages at the first level to the third level and the first flicker index to the third flicker index.

If the flicker index increases as the level of the bias voltage increases, the computing device may output the bias voltage control signal to control the voltage controller to apply the bias voltage to the display panel according to the third level, which is smaller than the bias voltages according to the first level and the second level, based on a first scenario of the plurality of pre-stored scenarios.

If the flicker index decreases as the level of the bias voltage increases, the computing device may output the bias voltage control signal to control the voltage controller to apply the bias voltage to the display panel according to the third level, which is greater than the bias voltages according to the first level and the second level, based on a second scenario of the plurality of pre-stored scenarios.

If the third flicker index corresponding to the bias voltage according to the third level is a value smaller than the first flicker index and the second flicker index, the computing device may output the bias voltage control signal to control the voltage controller to apply the bias voltage according to a fourth level greater than the third level, based on a third scenario of the plurality of pre-stored scenarios, and the computing device may receive a fourth flicker index corresponding to the bias voltage according to the fourth level.

The computing device may fit the quadratic function further based on the bias voltages according to the fourth level and the fourth flicker index.

At least one of the plurality of sub-pixels may include a sub-pixel circuit connected to a first power line to which a first power voltage is applied, and a light emitting element including an anode electrode connected to the sub-pixel circuit, a cathode electrode connected to a second power line to which a second power voltage is applied, and a light emitting structure disposed between the anode electrode and the cathode electrode, and the sub-pixel circuit may include a first transistor including a first electrode connected to a first node, a gate electrode connected to a second node, and a second electrode connected to a third node, a second transistor including a gate electrode connected to a first sub-gate line and configured to switch an electrical connection between the third node and a data line, a third transistor including a gate electrode connected to a second sub-gate line and configured to switch an electrical connection between the first node and the second node, a fourth transistor including a gate electrode connected to a third sub-gate line and configured to switch an electrical connection between the second node and a third power line to which a first initialization voltage is applied, a fifth transistor configured to switch an electrical connection between the third node and the first power line, a sixth transistor configured to switch an electrical connection between the first node and the anode electrode of the light emitting element, a seventh transistor including a gate electrode connected to a fourth sub-gate line and configured to switch an electrical connection between the anode electrode of the light emitting element and a fourth power line to which a second initialization voltage is applied, and an eighth transistor including a gate electrode connected to the fourth sub-gate line and configured to switch an electrical connection between the third node and a fifth power line to which the bias voltage is applied.

The first transistor, second transistor, and fifth to eighth transistors may be transistors including a P-type semiconductor. The third transistor and the fourth transistor may be transistors including an N-type semiconductor.

A gate electrode of each of the fifth transistor and the sixth transistor may be connected to one emission control line.

DETAILED DESCRIPTION

Figure 1:
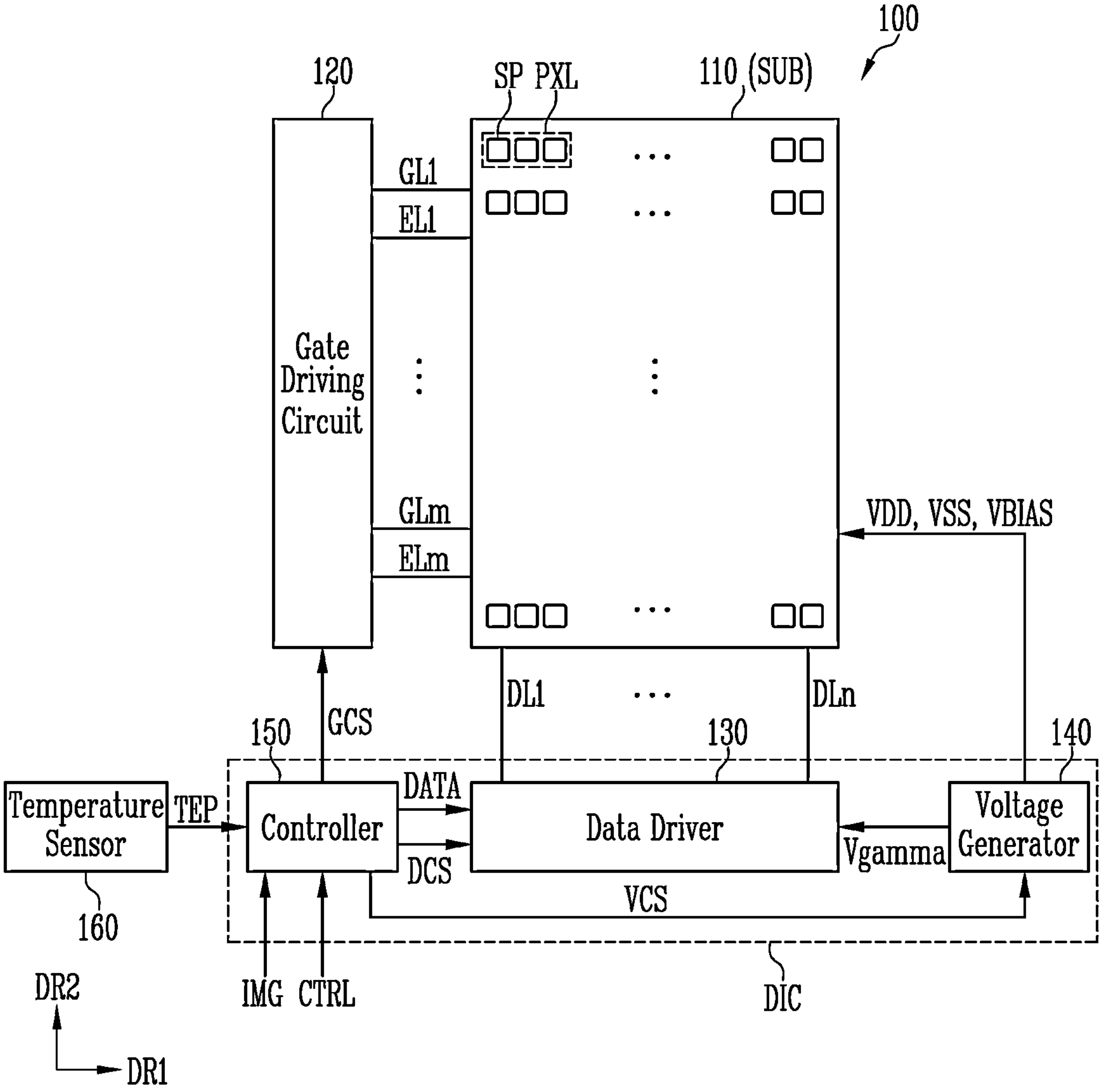
FIG. 1 is a system block diagram of a display device according to embodiments of the present disclosure.

Hereinafter, with reference to accompanying drawings, various embodiments of the present disclosure will be described in detail so that those skilled in the art can easily carry out the present disclosure. The present disclosure may be embodied in many different forms and is not limited to the embodiments described herein.

In order to clearly illustrate the present disclosure, parts that are not related to the description are omitted, and the same or similar constituent elements are given the same reference numerals throughout the specification. Therefore, the above-mentioned reference numerals can be used in other drawings.

In addition, since the size and thickness of each configuration illustrated in the drawing are arbitrarily illustrated for better understanding and ease of description, the present disclosure is not necessarily limited to the illustrated one. In the drawings, the dimensions of layers and regions are exaggerated for clarity of illustration.

In addition, the expression “the same” in the description may mean “substantially the same.” That is, it may be the same degree to which a person with ordinary knowledge can convince as the same. Other expressions may be expressions in which “substantially” is omitted. The term “substantially,” as used herein, means approximately or actually. The term “substantially the same,” as used herein, means approximately or actually the same (e.g., within a threshold difference amount).

The terms, ‘first’, ‘second’ and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. When explaining the singular, unless explicitly described to the contrary, it may be interpreted as the plural meaning.

Terms such as “under”, “below”, “on”, “above”, and the like are used to describe the relationship of elements illustrated in the drawings. The terms a relative concept and are made on the basis of the direction illustrated in the drawing.

Unless otherwise defined, all terms (including technical terms and scientific terms) used in this specification have the same meaning as commonly understood by a person skilled in the art to which the present invention pertains. Additionally, terms such as those defined in commonly used dictionaries should be construed as having a meaning consistent with their meaning in the context of the relevant technology, and unless interpreted in an idealized or overly formal sense, are explicitly defined herein.

The word “comprises” or “has” is used to specify existence of a feature, a number, a process, an operation, a constituent element, a part, or a combination thereof, and it will be understood that existence or additional possibility of one or more other features or numbers, processes, operations, constituent elements, parts, or combinations thereof are not excluded in advance.

Hereinafter, referring to the accompanying drawings, an embodiment of the present disclosure will be described in further detail.

FIG. 1 is a system block diagram of a display device 100 according to embodiments of the present disclosure.

Referring to FIG. 1, a display device 100 according to embodiments of the present disclosure includes a display panel 110, a gate driving circuit 120, a data driver 130, a voltage generator 140, a controller 150, and a temperature sensor 160.

The display panel 110 may include a plurality of sub-pixels SP. First to m-th gate lines GL1 to GLm (m is an integer of two or more) connected to a plurality of sub-pixels SP may be disposed on the display panel 110. First to n-th data lines DL1 to DLn (n is an integer of two or more) connected to a plurality of sub-pixels SP may be disposed on the display panel 110.

The plurality of sub-pixels SP may be connected (e.g., electrically connected) to the gate driving circuit 120 through the first to m-th gate lines GL1 to GLm. The plurality of sub-pixels SP may be connected (e.g., electrically connected) to the data driver 130 through the first to n-th data lines DL1 to DLn.

Each of the plurality of sub-pixels SP may include at least one light emitting element configured to generate light. Each of the plurality of sub-pixels SP may generate light of colors (e.g., specific color or specific wavelength band) such as, for example, red, green, blue, cyan, magenta, yellow, or the like. Two or more sub-pixels among the plurality of sub-pixels SP may constitute one pixel PXL. For example, as illustrated in FIG. 1, three sub-pixels may constitute one pixel PXL.

The gate driving circuit 120 may be connected (e.g., electrically connected) to a plurality of sub-pixels SP (e.g., a plurality of sub-pixels SP arranged overall in the first direction DR1) through the first to m-th gate lines GL1 to GLm. For example, the first direction DR1 may be a direction crossing from one side (e.g., left side) of the display panel 110 to the other side (e.g., right side) of the display panel 110. For example, the first direction DR1 may be a row direction.

The gate driving circuit 120 may output gate signals (e.g., gate signal at a turn-on level or a turn-off level) to the first to m-th gate lines GL1 to GLm in response to the gate control signal GCS. According to one or more embodiments of the present disclosure, the gate control signal GCS may include a start signal indicating the start of each frame, a horizontal synchronization signal for outputting gate signals in synchronization with the timing at which data signals are applied, and/or one or more other signals supportive of features of the display device 100.

According to one or more embodiments of the present disclosure, first to m-th emission control lines EL1 to ELm connected to a plurality of sub-pixels SP may be further disposed in the display panel 110. The first to m-th emission control lines EL1 to ELm may be disposed such that the first to m-th emission control lines EL1 to ELm extend in the row direction in the display panel 110. The plurality of sub-pixels SP may be connected (e.g., electrically connected) to the first to m-th emission control lines EL1 to ELm. In the embodiments described herein, the gate driving circuit 120 may include an emission control driver configured to control the first to m-th emission control lines EL1 to ELm. The emission control driver may operate under the control of the controller 150.

The gate driving circuit 120 may be disposed on one side of the display panel 110. However, the embodiments are not limited thereto. For example, the gate driving circuit 120 may be divided into two or more physically and/or logically separated driving circuits, and such driving circuits may be disposed on one side and another side (e.g., the opposite side of the display panel 110 facing one side) of the display panel 110. As such, the gate driving circuit 120 may be disposed within or around the display panel 110 in various forms according to embodiments.

The data driver 130 may be connected (e.g., electrically connected) to a plurality of sub-pixels SP (e.g., a plurality of sub-pixels SP arranged overall in the second direction DR2) through the first to n-th data lines DL1 to DLn. For example, the second direction DR2 may be a direction crossing from one side (e.g., lower side) of the display panel 110 to another side (e.g., upper side) of the display panel 110. For example, the second direction DR2 may be a column direction.

The data driver 130 may receive image data DATA and a data control signal DCS from the controller 150. The data driver 130 may operate in response to the data control signal DCS. According to one or more embodiments of the present disclosure, the data control signal DCS may include a source start pulse, a source shift clock, a source output enable signal, or one or more other signals supportive of aspects of the present disclosure.

The data driver 130 may use voltages (e.g., gamma voltage Vgamma) from the voltage generator 140 to apply data signals having grayscale voltages corresponding to the image data DATA to the first to n-th data lines DL1 to DLn. In an example in which a gate signal (e.g., gate signal at the turn-on level) is applied to each of the first to m-th gate lines GL1 to GLm, data signals corresponding to the image data DATA are applied to the data lines DL1 to DLn. Each of the plurality of sub-pixels SP may receive a data signal applied at a corresponding timing in response to a gate signal (e.g., gate signal at the turn-on level). A plurality of sub-pixels SP may generate light corresponding to an input data signal. Accordingly, an image may be displayed on the display panel 110.

According to one or more embodiments of the present disclosure, each of the gate driving circuit 120 and the data driver 130 may include complementary metal-oxide semiconductor CMOS circuit elements.

The voltage generator 140 may operate in response to a voltage control signal VCS from controller 150. The voltage generator 140 may be configured to generate a plurality of voltages and provide the generated voltages to components of the display device 100. For example, the voltage generator 140 may receive an input voltage from outside the display device 100. The voltage generator 140 may adjust (e.g., lower) the level of the received voltage and regulate the level-adjusted voltage. The voltage generator 140 may be configured to generate a plurality of voltages.

For example, the voltage generator 140 may generate a first power voltage VDD, a second power voltage VSS, a gamma voltage Vgamma, a bias voltage VBIAS, or other voltages supportive of aspects of the present disclosure. The generated first and second power voltages VDD and VSS and bias voltage VBIAS may be applied (e.g., commonly applied) to the plurality of sub-pixels SP. The first power voltage VDD may have a relatively high voltage level. The second power voltage VSS may have a lower voltage level than the first power voltage VDD. The bias voltage VBIAS may be set to an appropriate level supportive of alleviating changes in characteristics of switching elements (e.g., transistors) included in the sub-pixel SP. The generated gamma voltage Vgamma may be provided to the data driver 130. In other embodiments, at least one of the first power voltage VDD, the second power voltage VSS, and the bias voltage VBIAS may be provided by an external device (e.g., power management integrated circuit PMIS) of the display device 100.

According to embodiments, the voltage generator 140 may generate other voltages. For example, the voltage generator 140 may generate an initialization voltage (e.g., first initialization voltage, second initialization voltage, and the like) that is applied (e.g., commonly applied) to a plurality of sub-pixels SP. For example, during a sensing operation to sense the electrical characteristics of the transistors and/or light emitting element(s) of the plurality of sub-pixels SP, a predetermined reference voltage may be applied to the first to n-th data lines DL1 to DLn, and voltage generator 140 may generate the predetermined reference voltage.

The controller 150 may be configured to control various operations of the display device 100. The controller 150 may receive input image data IMG from the outside and a control signal CTRL for controlling its display. The controller 150 may provide a gate control signal GCS, a data control signal DCS, and a voltage control signal VCS in response to the received control signal CTRL.

The controller 150 may convert the input image data IMG to suit the display device 100 or display panel 110 and output image data DATA. According to one or more embodiments of the present disclosure, the controller 150 may output image data DATA by aligning the input image data IMG to suit the sub-pixels SP in units of row.

Two or more components of the data driver 130, voltage generator 140, and controller 150 may be mounted on one integrated circuit. As illustrated in FIG. 1, the data driver 130, voltage generator 140, and controller 150 may be included in a driver integrated circuit DIC. In this case, the data driver 130, voltage generator 140, and controller 150 may be functionally separate components within one driver integrated circuit DIC. In other embodiments, at least one of the data driver 130, voltage generator 140, and controller 150 may be mounted within a driver integrated circuit DIC, and another of the data driver 130, voltage generator 140, and controller 150 may be provided while being mounted in an integrated circuit other than the driver integrated circuit DIC.

The temperature sensor 160 may be configured to sense temperature (e.g., temperature of its surroundings) and generate temperature data TEP representing the sensed temperature. According to the embodiment, the temperature sensor 160 may be disposed on the display panel 110. According to the embodiment, the temperature sensor 160 may be disposed adjacent to the display panel 110 and/or the driver integrated circuit DIC. According to the embodiment, the display device 100 may include two or more temperature sensors 160.

The controller 150 may control various operations of the display device 100 in response to temperature data TEP. According to one or more embodiments of the present disclosure, the controller 150 may adjust luminance of an image output from the display panel 110 in response to temperature data TEP. For example, the controller 150 may control components such as, for example, the data driver 130 and/or the voltage generator 140 to adjust at least one of data signals, the first power voltage VDD, and the second power voltage VSS input to the display panel 110.

Figure 2:
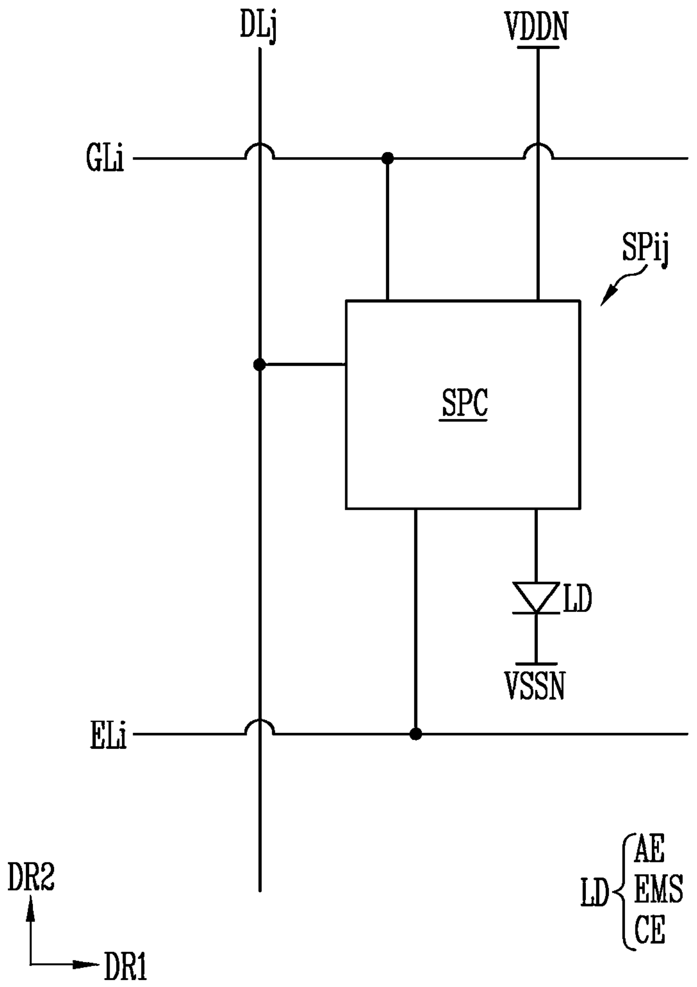
FIG. 2 is a block diagram illustrating an embodiment of the sub-pixels of FIG. 1.

FIG. 2 is a block diagram illustrating an embodiment of the sub-pixels SPij of FIG. 1.

In FIG. 2, the sub-pixel SPij arranged in the i-th (i is an integer between 1 and m) row and the j-th (j is an integer between 1 and n) column among the plurality of sub-pixels SP illustrated in FIG. 1, is illustrated as an example.

Referring to FIG. 2, the sub-pixel SPij may include a sub-pixel circuit SPC and a light emitting element LD.

The light emitting element LD may be connected (e.g., electrically connected) between the first power voltage node VDDN and the second power voltage node VSSN. The first power voltage node VDDN may be a node to which the first power voltage VDD of FIG. 1 is applied. The second power voltage node VSSN may be a node to which the second power voltage VSS of FIG. 1 is applied.

The light emitting element LD may include a first electrode, a light emitting structure EMS, and a second electrode. The first electrode may be one of the anode electrode AE and the cathode electrode CE of the light emitting element LD. The second electrode may be the other of the anode electrode AE and the cathode electrode CE of the light emitting element LD. For convenience of description, it will be described below as an example that the first electrode of the light emitting element LD is the anode electrode AE, and the second electrode of the light emitting element LD is the cathode electrode CE.

The anode electrode AE of the light emitting element LD may be connected (e.g., electrically connected) to the first power voltage node VDDN through the sub-pixel circuit SPC. The cathode electrode CE of the light emitting element LD may be connected (e.g., electrically connected) to the second power voltage node VSSN. For example, the anode electrode AE of the light emitting element LD may be connected (e.g., electrically connected) to the first power voltage node VDDN through one or more transistors included in the sub-pixel circuit SPC.

The sub-pixel circuit SPC of the sub-pixel SPij may be connected (e.g., electrically connected) to the i-th gate line GLi among the first to m-th gate lines GL1 to GLm of FIG. 1. The sub-pixel circuit SPC of the sub-pixel SPij may be connected (e.g., electrically connected) to the i-th emission control line ELi among the first to m-th emission control lines EL1 to ELm of FIG. 1. The sub-pixel circuit SPC of the sub-pixel SPij may be connected (e.g., electrically connected) to the j-th data line DLj among the first to n-th data lines DL1 to DLn of FIG. 1. The sub-pixel circuit SPC may be configured to control the emission timing and/or emission luminance of the light emitting element LD based on (or in response to) signals received through the signal lines described herein.

The sub-pixel circuit SPC may operate in response to a gate signal received through the i-th gate line GLi. The sub-pixel circuit SPC may operate in response to an emission control signal received through the i-th emission control line ELi.

The sub-pixel circuit SPC may receive a data signal through the j-th data line DLj. The sub-pixel circuit SPC may store a voltage of the data signal (or a voltage corresponding to the data signal) in response to a gate signal (e.g., gate signal at a turn-on level) received through the i-th gate line GLi. The sub-pixel circuit SPC may adjust the timing at which current flows in the light emitting element LD in response to an emission control signal (e.g., emission control signal at a turn-on level) applied through the i-th emission control line ELi. The size of the current flowing through the light emitting element LD may vary based on the voltage stored in the sub-pixel circuit SPC. The light emitting element LD may generate light with luminance corresponding to the data signal.

Figure 3:
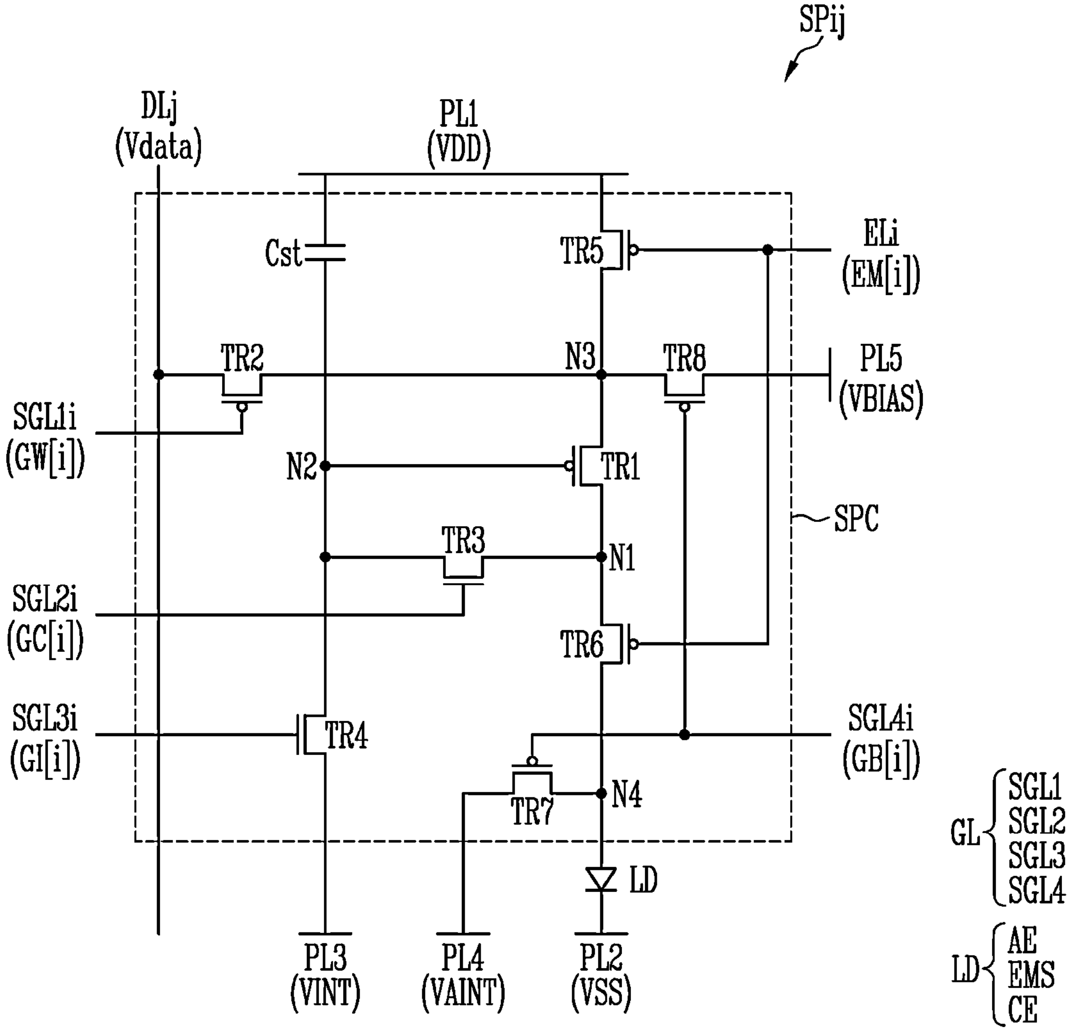
FIG. 3 is an equivalent circuit diagram according to an embodiment of the sub-pixel of FIG. 2.

FIG. 3 is an equivalent circuit diagram according to an embodiment of the sub-pixel SPij of FIG. 2.

A sub-pixel circuit SPC according to embodiments of the present disclosure may include two or more switching elements (e.g., transistors) and one or more storage elements (e.g., capacitors). For example, the sub-pixel circuit SPC according to embodiments of the present disclosure may include eight transistors and one capacitor. However, embodiments of the present disclosure are not limited thereto. Below, for convenience of description, embodiments of the present disclosure will be described with reference to an example embodiment including eight transistors and one capacitor as an example.

Referring to FIG. 3, the sub-pixel circuit SPC according to embodiments of the present disclosure may include first to eighth transistors TR1 to TR8 and a storage capacitor Cst.

The first transistor TR1 may include a first electrode connected (e.g., electrically connected) to the first node N1, a gate electrode connected (e.g., electrically connected) to the second node N2, and a second electrode connected (e.g., electrically connected) to the third node N3. The first electrode may be one (e.g., drain electrode) of the source electrode or the drain electrode. The second electrode may be the other (e.g., source electrode) of the source electrode and the drain electrode. The first transistor TR1 may be configured to supply a current (e.g., driving current) corresponding to the magnitude of the voltage applied to the second node N2 (or gate electrode).

The second transistor TR2 may be configured to switch an electrical connection between the third node N3 and the j-th data line DLj. The second transistor TR2 may include a gate electrode that is connected (e.g., electrically connected) to the i-th first sub-gate line SGL1*i* (hereinafter, also abbreviated as the first sub-gate line SGL1*i*) to which the first gate signal GW[i] is applied. The second transistor TR2 may electrically connect the j-th data line DLj and the third node N3 in response to the first gate signal GW[i] at the turn-on level.

The third transistor TR3 may be configured to switch the electrical connection between (e.g., to electrically connect or disconnect) the first node N1 and the second node N2. The third transistor TR3 may include a gate electrode that is connected (e.g., electrically connected) to the i-th second sub-gate line SGL2*i* (hereinafter, also abbreviated as the second sub-gate line SGL2*i*) to which the second gate signal GC[i] is applied. The third transistor TR3 may electrically connect the first node N1 and the second node N2 in response to the second gate signal GC[i] at the turn-on level. When the third transistor TR3 is turned on, the first transistor TR1 may be connected in diode form.

The fourth transistor TR4 may be configured to switch the electrical connection between (e.g., to electrically connect or disconnect) the second node N2 and the third power line PL3 to which the first initialization voltage VINT is applied. The fourth transistor TR3 may include a gate electrode that is connected (e.g., electrically connected) to the i-th third sub-gate line SGL3*i* (hereinafter, also abbreviated as the third sub-gate line SGL3*i*) to which the third gate signal GI[i] is applied. The fourth transistor TR4 may electrically connect the second node N2 and the third power line PL3 in response to the third gate signal GI[i] at the turn-on level.

The fifth transistor TR5 may be configured to switch the electrical connection between (e.g., to electrically connect or disconnect) the third node N3 and the first power line PL1 to which the first power voltage VDD is applied. The fifth transistor TR5 may include a gate electrode that is connected (e.g., electrically connected) to the i-th emission control line ELi (hereinafter, also abbreviated as the emission control line ELi) to which the emission control signal EM[i] is applied. The fifth transistor TR5 may electrically connect the first power line PL1 and the third node N3 in response to the emission control signal EM[i] at the turn-on level.

The sixth transistor TR6 may be configured to switch the electrical connection between (e.g., to electrically connect or disconnect) the first node N1 and the fourth node N4. The sixth transistor TR6 may include a gate electrode that is connected (e.g., electrically connected) to the emission control line ELi. The sixth transistor TR6 may electrically connect the first node N1 and the fourth node N4 in response to the emission control signal EM[i] at the turn-on level.

The seventh transistor TR7 may be configured to switch the electrical connection between (e.g., to electrically connect or disconnect) the fourth node N4 and the fourth power line PL4 to which the second initialization voltage VAINT is applied. The seventh transistor TR7 may include a gate electrode that is connected (e.g., electrically connected) to the i-th fourth sub-gate line SGL4*i* (hereinafter, also abbreviated as the fourth sub-gate line SGL4*i*) to which the fourth gate signal GB[i] is applied. The seventh transistor TR7 may electrically connect the fourth node N4 and the fourth power line PL4 in response to the fourth gate signal GB[i] at the turn-on level.

The eighth transistor TR8 may be configured to switch the electrical connection between (e.g., to electrically connect or disconnect) the third node N3 and the fifth power line PL5 to which the bias voltage VBIAS is applied. The eighth transistor TR8 may include a gate electrode that is connected (e.g., electrically connected) to the fourth sub-gate line SGL4*i*. The eighth transistor TR8 may electrically connect the third node N3 and the fifth power line PL5 in response to the fourth gate signal GB[i] at the turn-on level.

Referring to FIG. 3, an embodiment is illustrated in which the gate electrode of the fifth transistor TR5 and the gate electrode of the sixth transistor TR6 are connected to the same emission control line Eli. However, embodiments of the present disclosure are not limited thereto, and the gate electrodes of the fifth transistor TR5 and the sixth transistor TR6 may be connected to different respective emission control lines.

Referring to FIG. 3, an embodiment is illustrated in which the gate electrode of the seventh transistor TR7 and the gate electrode of the eighth transistor TR8 are connected to the same fourth sub-gate line SGL4*i*. However, embodiments of the present disclosure are not limited thereto, and the gate electrode of the seventh transistor TR7 and the gate electrode of the eighth transistor TR8 may be connected to different respective sub-gate lines.

Referring to FIG. 3, each of the first to eighth transistors TR1 to TR8 may include a semiconductor layer. The semiconductor layer may include a channel region that overlaps the gate electrode, a source region disposed on one side of the channel region, and a drain region disposed on the other side of the channel region.

Referring to FIG. 3, the third and fourth transistors TR3 and TR4 may include an N-type semiconductor layer. The first, second, and fifth to eighth transistors TR1, TR2, and TR5 to TR8 may include a P-type semiconductor layer. However, embodiments of the present disclosure are not limited thereto. For example, at least one of the third and fourth transistors TR3 and TR4 may include a P-type semiconductor layer. In another example, at least one of the first, second, and fifth to eighth transistors TR1, TR2, TR5 to TR8 may include an N-type semiconductor layer.

The third and fourth transistors TR3 and TR4 may include an oxide semiconductor. The first, second, and fifth to eighth transistors TR1, TR2, and TR5 to TR8 may include a silicon semiconductor (e.g., low temperature polycrystalline silicon (LTPS) semiconductor).

In an embodiment in which the third and fourth transistors TR3 and TR4 include an oxide semiconductor, the third and fourth transistors TR3 and TR4 may be advantageous in reducing leakage current. As a result, the voltage of the second node N2 can be maintained for a relatively long time (e.g., greater than a threshold temporal duration), allowing images to be displayed at various refresh rates (e.g., low refresh rate).

In some cases, when an image is continuously displayed at the low refresh rate, the first power voltage VDD of high potential can be continuously applied to the source electrode of the first transistor TR1, thereby changing the current driving ability of the first transistor TR1. In some cases, the current driving ability of the first transistor TR1 can fluctuate. A change in the current driving ability of the first transistor TR1 may be perceived by the user as a change in luminance (or a flicker phenomenon). The degree to which the flicker phenomenon is perceived by the user can be measured, for example, through the flicker index used in the prior art.

The bias voltage VBIAS may be applied to the source electrode of the first transistor TR1 to improve the change in the current driving ability (or change in hysteresis characteristics) of the first transistor TR1.

However, the level of the bias voltage VBIAS (e.g., level of the optimal bias voltage VBIAS) for alleviating the change in the current driving ability of the first transistor TR1 may change based on the display panel 110 (see FIG. 1). Accordingly, the level of the bias voltage VBIAS must be adaptively set based on the display panel 110 (see FIG. 1).

Figure 4:
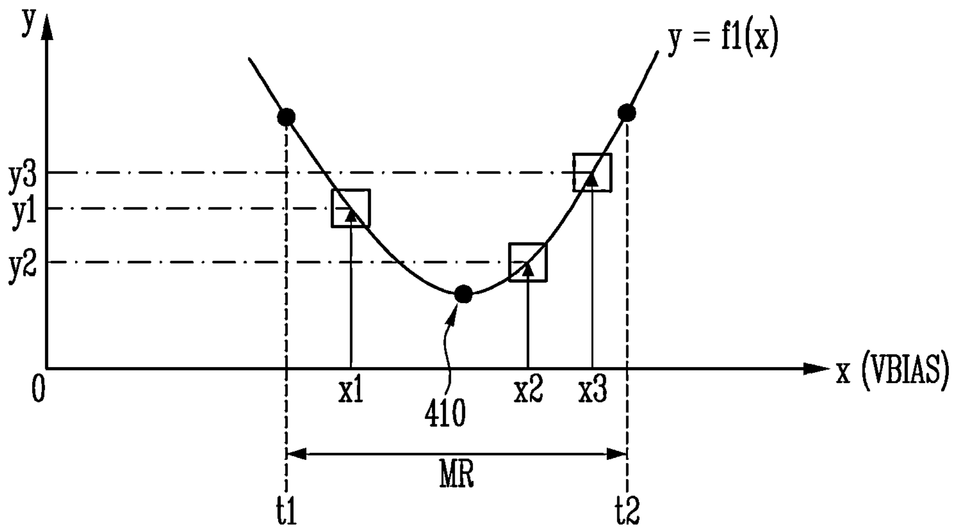
FIG. 4 is an example illustrating a flicker index of a display panel based on a change in a level of a bias voltage.

FIG. 4 is an example illustrating a flicker index of a display panel based on a change in a level of a bias voltage VBIAS.

Referring to FIG. 4, the level of bias voltage VBIAS is illustrated with respect to the x-axis, and the flicker index is illustrated with respect to the y-axis.

The Illuminating Engineering Society (IES), which corresponds to the industry, defines the flicker index as a measure of the cyclic variation taking into account the shape of the waveform. In this specification, the flicker index is explained as a value measured according to the manner the flicker index is defined in the IES. The flicker index may have values between zero and one.

Embodiments of the present disclosure include applying the bias voltage VBIAS according to a selected level (voltage level) which results in a target flicker index (e.g., the smallest flicker index among flicker indexes corresponding to candidate levels for the bias voltage VBIAS). Experimentally, it is known that the relationship between the bias voltage VBIAS and the flicker index is similar to a quadratic function. Accordingly, for example, embodiments of the present disclosure support selecting the x value at the vertex 410 of the calculated quadratic function as the level of the bias voltage VBIAS. As a result, embodiments of the present disclosure described herein support effective selection of a bias voltage VBIAS of a level that results in the smallest flicker index.

According to one or more embodiments of the present disclosure, a quadratic function $y=f1(x)$ representing the relationship between the bias voltage VBIAS and the flicker index may be defined as $y=ax^2+bx+c$. In some aspects, the techniques described herein apply principles for determining unknowns (e.g., a, b, and c) for cases in which the coordinates of the three points through which the quadratic function passes are known.

Referring to FIG. 4, the first point (x1, y1), the second point (x2, y2), and the third point (x3, y3) are illustrated as three points through which the quadratic function passes. Each of x1, x2, and x3 may correspond to the level of the bias voltage VBIAS. Each of y1, y2, and y3 may correspond to the flicker index measured at the corresponding level of bias voltage VBIAS.

The three points may be disposed within a measurement range MR (or a predetermined measurement range MR) of the bias voltage VBIAS. For example, the measurement range MR may be between the bias voltage VBIAS of the first reference level t1 and the bias voltage VBIAS of the second reference level t2. Referring to FIG. 4, the bias voltage (x1) according to the first level may be greater than the first reference level (t1), and the bias voltage (x3) according to the third level may be less than the second reference level (t2).

At this time, it is preferable that the vertex 410 is disposed between the three measured points. For example, the techniques described herein may include identifying a vertex (e.g., vertex 410) among three measured points. In an example, in the relationship between the first point (x1, y1) and the second point (x2, y2), as the voltage level of the bias voltage VBIAS increases, the flicker index decreases. And, in the relationship between the second point (x2, y2) and the third point (x3, y3), as the voltage level of the bias voltage VBIAS increases, the flicker index also increases. In the above relationship, the vertex 410 of the quadratic function may be disposed between the first point (x1, y1) and the third point (x3, y3). In the embodiments described herein, the position of the vertex 410 where the flicker index is minimized can be estimated more clearly.

Figure 5:
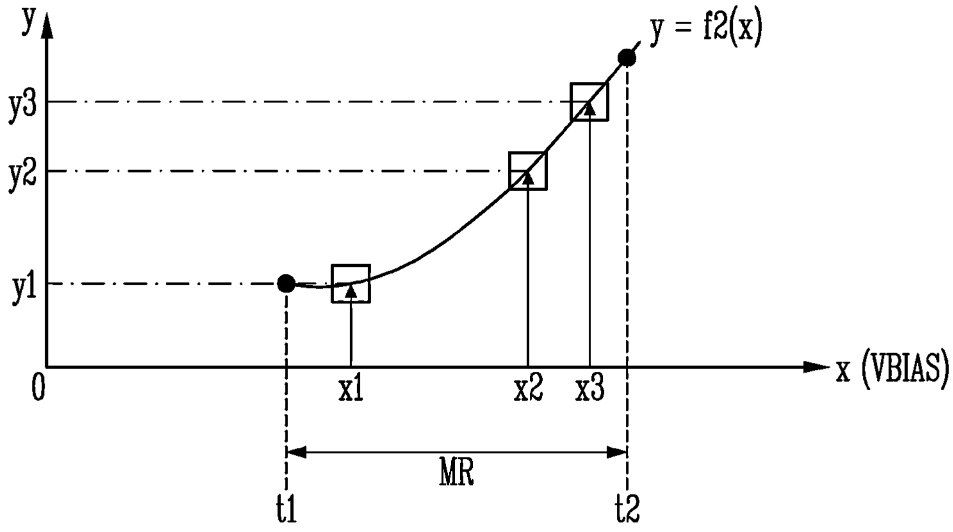
FIG. 5 is another example illustrating a flicker index of a display panel based on a change in a level of a bias voltage.

FIG. 5 is another example illustrating a flicker index of a display panel based on a change in a level of a bias voltage VBIAS.

Referring to FIG. 5, a quadratic function y=f2(x) representing the relationship between the bias voltage VBIAS and the flicker index may be defined. Referring to FIG. 5, the first point (x1, y1), the second point (x2, y2), and the third point (x3, y3) are illustrated as three points through which the quadratic function passes. Each of x1, x2, and x3 correspond to the level of the bias voltage VBIAS. Each of y1, y2, and y3 correspond to the flicker index measured at the corresponding level of bias voltage VBIAS.

The three points may be disposed within a measurement range MR (or a predetermined measurement range MR) of the bias voltage VBIAS. For example, the measurement range MR may be between the bias voltage VBIAS of the first reference level t1 and the bias voltage VBIAS of the second reference level t2. Referring to FIG. 5, the bias voltage (x1) according to the first level may be greater than the first reference level (t1), and the bias voltage (x3) according to the third level may be less than the second reference level (t2).

Referring to FIG. 5, in some cases, the vertex of the quadratic function may not be disposed between the three measured points. For example, in the relationship between the first point (x1, y1) and the second point (x2, y2), as the voltage level of the bias voltage VBIAS increases, the flicker index increases. And, in the relationship between the second point (x2, y2) and the third point (x3, y3), as the voltage level of the bias voltage VBIAS increases, the flicker index increases. In the above relationship, the vertex of the quadratic function may not be disposed between the first point (x1, y1) and the third point (x3, y3). In the example embodiment described herein, when y=f2(x) is calculated using the three measured points and without other measured points (e.g., only the three measured points), the error in the position of the vertex may be greater than the example in FIG. 4.

Aspects of the present disclosure described herein support a method of calculating the bias voltage VBIAS according to a level that results in the smallest flicker index through a minimum number of measurements (e.g., below a threshold value).

Figure 6:
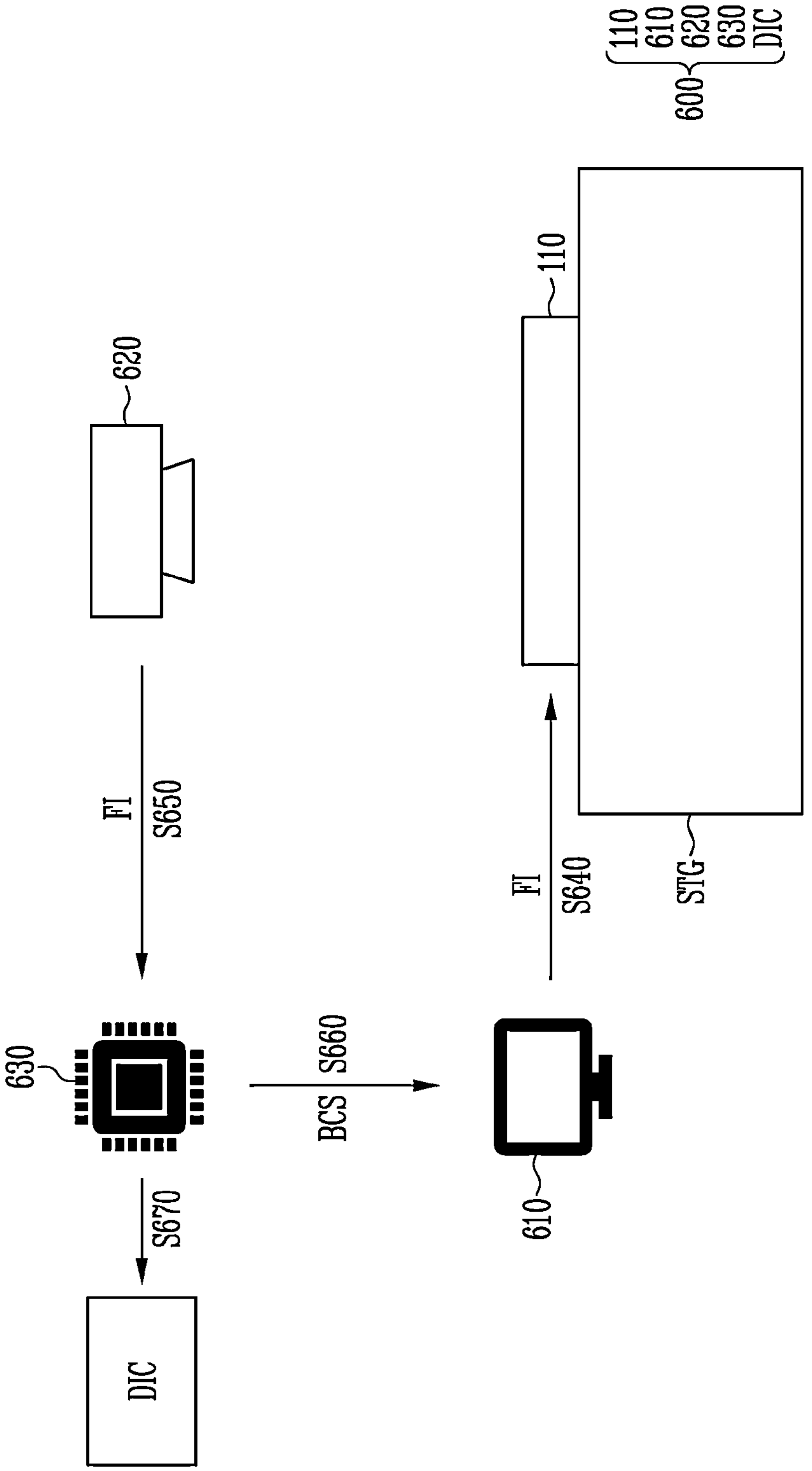
FIG. 6 is a system block diagram of a system for setting a bias voltage according to embodiments of the present disclosure.

FIG. 6 is a system block diagram of a system 600 for setting a bias voltage according to embodiments of the present disclosure.

Referring to FIG. 6, the system 600 for setting a bias voltage according to embodiments of the present disclosure may include a display panel 110, a voltage controller 610, a luminance meter 620, a computing device 630, and a driver integrated circuit DIC, and other suitable components supportive of features of the system 600.

The system 600 may support applying a bias voltage VBIAS to the display panel 110. The change in luminance of the display panel 110 may change based on the level (voltage level) of the applied bias voltage VBIAS. The change in luminance of the display panel 110 may be measured as the flicker index FI.

The voltage controller 610 may output a bias voltage VBIAS at a level corresponding to the bias voltage control signal BCS in response to the bias voltage control signal BCS.

The luminance meter 620 may capture one or more images of the display panel 110 and detect the change in luminance of the display panel 110 based on the one or more images. The luminance meter 620 may generate the flicker index FI based on the detected change in luminance of the display panel 110.

The computing device 630 may output a bias voltage control signal BCS. The computing device 630 may receive the flicker index FI corresponding to the bias voltage VBIAS. The computing device 630 may calculate the change in the flicker index FI based on the change (e.g., the increase) in the level of the bias voltage VBIAS.

The computing device 630 may select one of a plurality of pre-stored scenarios based on the calculated change in flicker index FI (e.g., in response to calculating the change in flicker index FI). The computing device 630 may output, to the voltage controller 610, a bias voltage control signal BCS associated with changing the level of the bias voltage VBIAS based on the selected scenario. The computing device 630 may receive the flicker index FI corresponding to the changed level of the bias voltage VBIAS.

The computing device 630 may calculate a quadratic function corresponding to the relationship between the bias voltage VBIAS and the flicker index FI based on the bias voltages VBIAS and the flicker index FI.

The computing device 630 may record the bias voltage VBIAS at which the flicker index FI becomes the smallest in the calculated quadratic function to the driver integrated circuit DIC.

The computing device 630 may include a processor configured to perform the operations described herein. The computing device 630 may include a memory (e.g., buffer memory) for storing values calculated based on the operation of the processor. The computing device 630 may further include a memory (e.g., non-volatile memory) in which a plurality of scenarios are pre-stored.

The computing device 630 may further include a communicator (e.g., communication circuitry) (not illustrated) for communicating with the voltage controller 610 and/or the luminance meter 620. For example, the communicator may communicate with the voltage controller 610 and/or the luminance meter 620 through a wired or wireless communication interface.

A driving method of the system 600 for setting the bias voltage according to one or more embodiments of the present disclosure is briefly described as follows.

In applying the voltage (S640), the voltage controller 610 may apply a bias voltage VBIAS corresponding to the bias voltage control signal BCS.

In generating the flicker index FI (S650), the luminance meter 620 may capture one or more images of the display panel 110 on the stage STG, determine the change in luminance of the display panel 110 based on the one or more images, and generate the flicker index FI based on the change in luminance of the display panel 110.

In changing the bias voltage control signal BCS (S660), the computing device 630 may select one of the pre-stored scenarios based on the change in the flicker index FI based on the increase in the bias voltage VBIAS. The computing device 630 may change and output the bias voltage control signal BCS such that the bias voltage VBIAS changes based on the selected scenario. For example, the computing device 630 may change and output the bias voltage control signal BCS based on the selected scenario, and the bias voltage VBIAS output by the voltage controller 610 may change based on the bias voltage control signal BCS.

In recording the bias voltage (S670), the computing device 630 (S670) may calculate a quadratic function corresponding to the relationship between the bias voltages VBIAS and the input flicker indices FI based thereon. The computing device 630 (S670) may calculate the bias voltage VBIAS at which the flicker index FI is minimized (e.g., calculate the bias voltage VBIAS at which the flicker index FI is less than or equal to a threshold value), and the computing device 630 may record the value of the calculated bias voltage VBIAS to the driver integrated circuit DIC.

Figure 7:
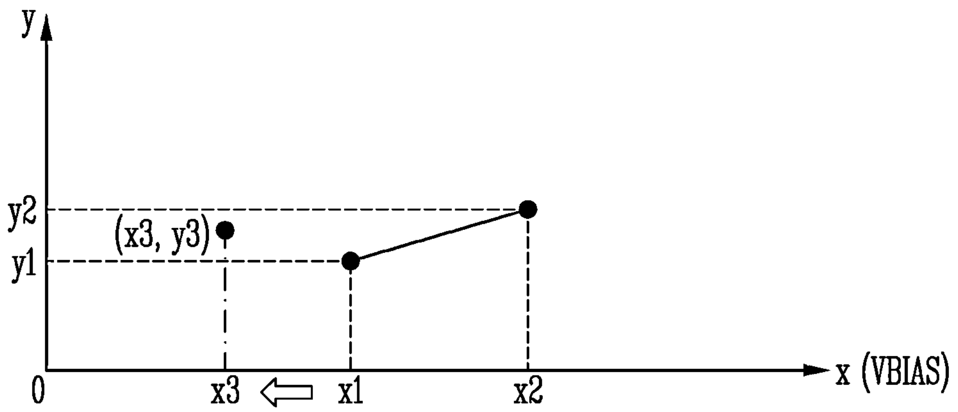
FIG. 7 illustrates an embodiment in which a bias voltage according to a third level is applied when a first scenario is selected in the system for setting the bias voltage.

FIG. 7 illustrates an embodiment in which a bias voltage VBIAS according to a third level is applied when a first scenario is selected in the system (e.g., system 600) for setting the bias voltage.

Referring to FIG. 7, a first scenario among a plurality of scenarios is illustrated. The first scenario may correspond to a case where the flicker index increases as the level of the bias voltage VBIAS increases. Referring to FIG. 7, with reference to the first point (x1, y1) and the second point (x2, y2), the flicker index may increase as the bias voltage VBIAS increases. x1 may correspond to the bias voltage VBIAS according to the first level, and x2 may correspond to the bias voltage VBIAS at the second level.

In the first scenario, the bias voltage VBIAS according to the third level may be set in a range smaller than the bias voltage VBIAS according to the first level. The flicker index corresponding to the bias voltage VBIAS according to the third level may be the third flicker index (y3). The third flicker index (y3) may be a value between the first flicker index (y1) and the second flicker index (y2).

Accordingly, the vertex of the quadratic function may be disposed between the third point (x3, y3) and the second point (x2, y2). In the example of FIG. 7, the vertex is disposed at the first point (x1, y1). Accordingly, the bias voltage VBIAS according to the level that minimizes the flicker index (e.g., bias voltage VBIAS corresponding to x1) can be accurately calculated.

Figure 8:
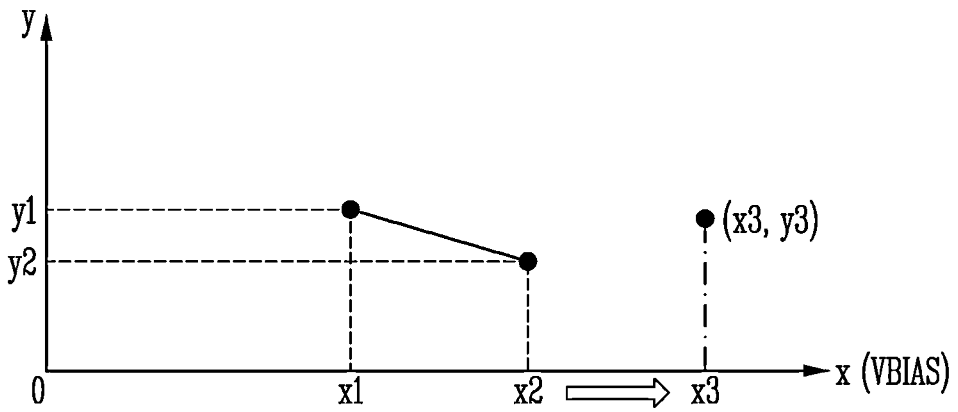
FIG. 8 illustrates an embodiment in which a bias voltage according to a third level is applied when a second scenario is selected in the system for setting the bias voltage.

FIG. 8 illustrates an embodiment in which a bias voltage VBIAS according to a third level is applied when a second scenario is selected in the system for setting the bias voltage VBIAS.

Referring to FIG. 8, a second scenario among a plurality of scenarios is illustrated. The second scenario may correspond to a case where the flicker index decreases as the level of the bias voltage VBIAS increases. Referring to FIG. 8, with reference to the first point (x1, y1) and the second point (x2, y2), the flicker index may decrease as the bias voltage VBIAS increases. x1 may correspond to the bias voltage VBIAS according to the first level, and x2 may correspond to the bias voltage VBIAS according to the second level.

In the second scenario, the bias voltage VBIAS according to the third level may be set in a range greater than the bias voltage VBIAS at the second level. The flicker index corresponding to the bias voltage VBIAS according to the third level may be the third flicker index (y3). The third flicker index (y3) may be a value between the first flicker index (y1) and the second flicker index (y2).

Accordingly, the vertex of the quadratic function may be disposed between the first point (x1, y1) and the third point (x3, y3). Accordingly, the bias voltage VBIAS at the level that minimizes the flicker index (e.g., bias voltage VBIAS corresponding to x2) can be accurately calculated.

Figure 9:
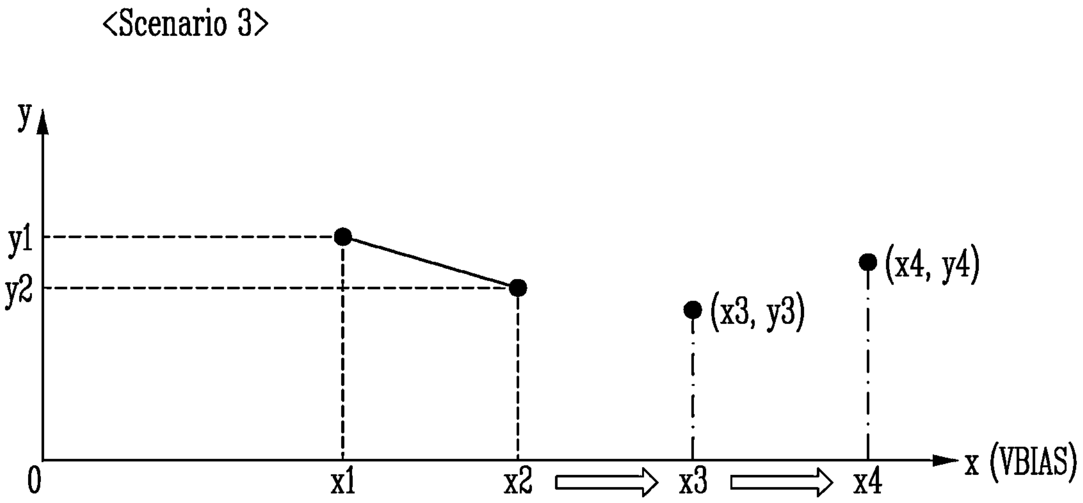
FIG. 9 illustrates an embodiment in which a bias voltage according to a third level and a bias voltage according to a fourth level is applied when a third scenario is selected in the system for setting the bias voltage.

FIG. 9 illustrates an embodiment in which a bias voltage VBIAS according to a third level and a bias voltage VBIAS according to a fourth level is applied when a third scenario is selected in the system for setting the bias voltage VBIAS.

Referring to FIG. 9, a third scenario among a plurality of scenarios is illustrated. The third scenario may correspond to a case where the flicker index decreases as the level of the bias voltage VBIAS increases. Referring to FIG. 9, with reference to the first point (x1, y1) and the second point (x2, y2), the flicker index may decrease as the bias voltage VBIAS increases. x1 may correspond to the bias voltage VBIAS according to the first level, and x2 may correspond to the bias voltage VBIAS at the second level.

In the third scenario, the bias voltage VBIAS according to the third level may be set in a range greater than the bias voltage VBIAS according to the second level. The flicker index corresponding to the bias voltage VBIAS according to the third level may be the third flicker index (y3). The third flicker index (y3) may be smaller than the second flicker index (y2).

In the above case, the third point (x3, y3) may not be between the first point (x1, y1) and the second point (x2, y2). The third point (x3, y3) may be outside the first point (x1, y1) and the second point (x2, y2).

In the third scenario, the bias voltage VBIAS according to the fourth level may be set in a range greater than the bias voltage VBIAS according to the third level. The flicker index corresponding to the bias voltage VBIAS according to the fourth level may be the fourth flicker index (y3). The fourth flicker index (y4) may be greater than the third flicker index (y3).

Accordingly, the vertex of the quadratic function may be disposed between the first point (x1, y1) and the fourth point (x4, y4). Accordingly, the bias voltage VBIAS at the level that minimizes the flicker index (e.g., bias voltage VBIAS corresponding to x3) can be accurately calculated.

Figure 10:
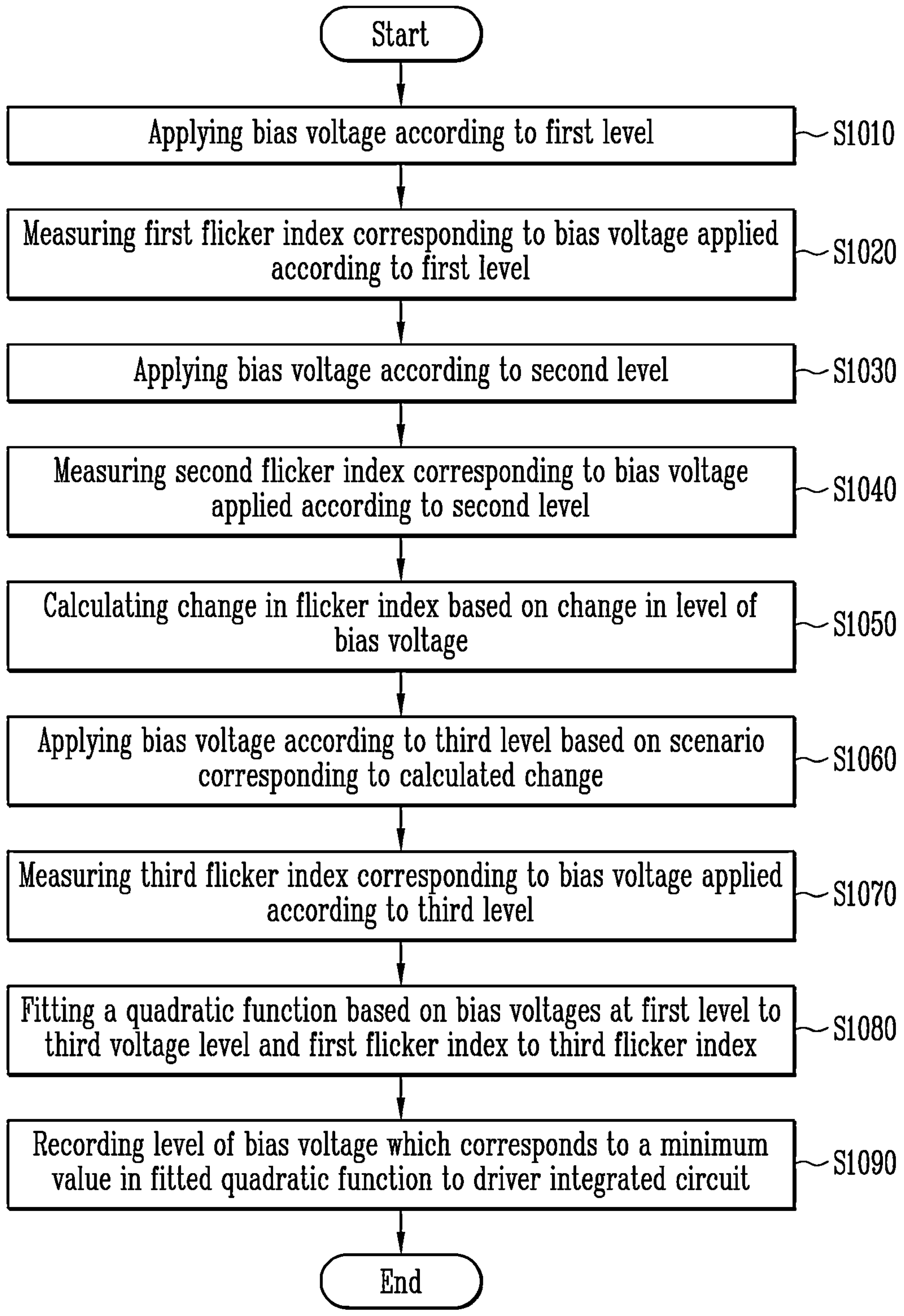
FIG. 10 is a flowchart of a method for setting a bias voltage according to an embodiment of the present disclosure.

FIG. 10 is a flowchart of a method 1000 for setting a bias voltage according to an embodiment of the present disclosure.

Referring to FIG. 10, a method 1000 for setting a bias voltage according to embodiments of the present disclosure includes applying a bias voltage according to a first level (S1010), measuring a first flicker index corresponding to the bias voltage applied according to the first level (S1020), applying the bias voltage according to a second level (S1030), measuring a second flicker index corresponding to the bias voltage applied according to the second level (S1040), calculating a change in the flicker index based on a change (e.g., an increase) in the level of the bias voltage (S1050), applying a bias voltage according to a third level based on a scenario corresponding to the calculated change (S1060), measuring a third flicker index corresponding to the bias voltage applied according to the third level (S1070), fitting a quadratic function based on the bias voltages at the first level to the third voltage level and the first flicker index to the third flicker index (S1080), and recording a level of the bias voltage which corresponds to a minimum value (e.g., a lowest flicker index) in the fitted quadratic function to a driver integrated circuit (S1090).

Referring further to FIG. 7, in the method 1000 for setting the bias voltage according to embodiments of the present disclosure, fitting the quadratic function (S1080) includes, if the third flicker index (y3) is a value between the first flicker index (y1) and the second flicker index (y2), fitting the quadratic function based only on the bias voltages (x1, x2, x3) at the first to third level and the first to third flicker indices (y1, y2, y3). For example, based on determining that the third flicker index (y3) is between the first flicker index (y1) and the second flicker index (y2), the method 1000 may include fitting the quadratic function based on (e.g., based only on) the bias voltages (x1, x2, x3) applied according to the first to third level and the first to third flicker indices (y1, y2, y3).

Referring further to FIG. 7, in the method 1000 for setting the bias voltage according to embodiments of the present disclosure, the method 1000 may include, if in the calculating the change in the flicker index based on the change (e.g., the increase) in the level of the bias voltage (S1050), the flicker index increases as the level of the bias voltage increases, applying the bias voltage (x3) according to the third level, which is smaller than the bias voltages (x1, x2) applied according to the first level and the second level, to the display panel 110 (see FIG. 1) based on a first scenario of a plurality of pre-stored scenarios. For example, based on determining the flicker index increases as the bias voltage increases, the method 1000 may include applying the bias voltage (x3) according to the third level based on the first scenario of the plurality of pre-stored scenarios.

Referring further to FIGS. 8 and 9, in the method 1000 for setting the bias voltage according to embodiments of the present disclosure, the method 1000 may include, if in the calculating the change in the flicker index based on the change (e.g., the increase) in the level of the bias voltage (S1050), the flicker index decreases as the level of the bias voltage increases, applying the bias voltage (x3) according to the third level, which is greater than the bias voltages (x1, x2) applied according to the first and second levels, to the display panel 110 (see FIG. 1) based on a second scenario of the plurality of pre-stored scenarios. For example, based on determining the flicker index decreases as the bias voltage increases, the method 1000 may include applying the bias voltage (x3) according to the third level based on the second scenario of the plurality of pre-stored scenarios.

Referring further to FIG. 9, the method 1000 for setting the bias voltage according to embodiments of the present disclosure may further include, if the third flicker index (y3) is smaller than the first and second flicker indexes (y1, y2), applying the bias voltage (x4) according to a fourth level greater than the third level to the display panel 110 (see FIG. 1) based on a third scenario among the plurality of pre-stored scenarios. The method 1000 may include receiving, by the computing device 630 (see FIG. 6), a fourth flicker index (y4) corresponding to the bias voltage (x4) applied according to the fourth level.

Referring further to FIG. 9, in the method 1000 for setting the bias voltage according to embodiments of the present disclosure, fitting the quadratic function (S1080) may include further fitting the quadratic function based on the bias voltage (x4) applied according to the fourth level and the fourth flicker index (y4).

Referring further to FIGS. 7 to 9, the bias voltage (x2) applied according to the second level may be greater than the bias voltage (x1) applied according to the first level. However, embodiments of the present disclosure are not limited thereto, and the bias voltage (x2) applied according to the second level may be smaller than the bias voltage (x1) applied according to the first level.

Referring further to FIG. 6, in the applying the bias voltage according to the first level to the display panel 110 (see FIG. 1) (S1010), the computing device 630 may output the bias voltage control signal BCS to the voltage controller 610. The voltage controller 610 may apply the bias voltage according to the first level to the display panel 110 based on the bias voltage control signal BCS input to the voltage controller 610.

Referring further to FIG. 6, in the measuring the first flicker index (S1020), the computing device 630 may receive the first flicker index from the luminance meter 620. The luminance meter 620 may output the first flicker index generated based on a change in luminance of the display panel 110 while the bias voltage according to the first level is applied to the display panel 110. Accordingly, for example, the method 1000 may include outputting, by the luminance meter 620, the first flicker index generated based on the change in luminance of the display panel 110 while the bias voltage according to the first level is applied to the display panel 110. In the descriptions of the methods and processes herein, the operations may be performed in a different order than the order shown and/or described, or the operations may be performed in different orders or at different times. Certain operations may also be left out of the flowcharts, one or more operations may be repeated, or other operations may be added.

According to a system for setting a bias voltage setting and a method for setting the bias voltage according to embodiments of the present disclosure, the level of the bias voltage that minimizes the flicker phenomenon by minimizing a change in luminance of the display panel based on the bias voltage can be calculated through minimal measurements (e.g., a reduced quantity of data points (measurements) including flicker indices and corresponding levels of the bias voltage VBIAS).

The drawings and the descriptions of the present disclosure is intended to be illustrative. The drawings and descriptions are not to be used to limit the meaning or the scope of the present disclosure described in claims, but are merely used to explain aspects supported by the present disclosure. Therefore, it will be understood by those skilled in the art that various modifications and equivalent other embodiments are possible therefrom. Hence, the real protective scope of the present invention shall be determined by the technical scope of the accompanying claims.

What is claimed is:

1. A method for setting, by a computing device, a bias voltage of a driver integrated circuit that supplies voltage to a display panel, the method comprising:

applying the bias voltage to the display panel according to a first level;

receiving, from the display panel, a first flicker index corresponding to the bias voltage applied according to the first level;

applying the bias voltage to the display panel according to a second level different from the first level;

receiving a second flicker index corresponding to the bias voltage applied according to the second level;

calculating a change in flicker index based on a change in the level of the bias voltage;

selecting one of a plurality of pre-stored scenarios based on the calculated change in the flicker index and, based on the selected scenario, applying the bias voltage to the display panel according to a third level;

receiving a third flicker index corresponding to the bias voltage applied according to the third level;

fitting a quadratic function based on the bias voltages at the first level to the third level and the first flicker index to the third flicker index; and recording, to the driver integrated circuit, a level of the bias voltage which corresponds to a minimum value in the fitted quadratic function.

2. The method of claim 1, wherein fitting the quadratic function comprises:

if the third flicker index is a value between the first flicker index and the second flicker index, fitting the quadratic function based only on the bias voltages applied according to the first to third level and the first flicker index to the third flicker index.

3. The method of claim 1, further comprising:

if, in the calculating the change in the flicker index based on the change in the level of the bias voltage, the flicker index increases as the level of the bias voltage increases, applying the bias voltage according to the third level, which is smaller than the bias voltages applied according to the first level and the second level, to the display panel based on a first scenario of the plurality of pre-stored scenarios.

4. The method of claim 1, further comprising:

if, in the calculating the change in the flicker index based on the change in the level of the bias voltage, the flicker index decreases as the level of the bias voltage increases, applying the bias voltage according to the third level, which is greater than the bias voltages according to the first level and the second level, to the display panel based on a second scenario of the plurality of pre-stored scenarios.

5. The method of claim 4, further comprising:

if the third flicker index is smaller than the first and second flicker indexes, applying the bias voltage to the display panel according to a fourth level greater than the third level based on a third scenario of the plurality of pre-stored scenarios; and receiving a fourth flicker index corresponding to applying the bias voltage according to the fourth level.

6. The method of claim 5, wherein fitting the quadratic function comprises further fitting the quadratic function based on the bias voltage applied according to the fourth level and the fourth flicker index.

7. The method of claim 1, wherein the bias voltage applied according to the second level is greater than the bias voltage applied according to the first level.

8. The method of claim 1, wherein:

applying the bias voltage to the display panel according to the first level comprises outputting, by the computing device, a bias voltage control signal to a voltage controller, and applying the bias voltage to the display panel according to the first level is by the voltage controller, based on the bias voltage control signal.

9. The method of claim 1, further comprising:

outputting, by a luminance meter, the first flicker index generated based on a change in luminance of the display panel while the bias voltage according to the first level is applied to the display panel, wherein receiving the first flicker index comprises receiving, by the computing device, the first flicker index from the luminance meter.

10. A system for setting a bias voltage, the system comprising:

a voltage controller configured to apply a bias voltage based on a bias voltage control signal;

a display panel in which a plurality of sub-pixels to which the bias voltage is commonly applied are disposed, wherein a change in luminance associated with the display panel varies based on a level of the bias voltage applied to the plurality of sub-pixels;

a luminance meter configured to capture one or more images of the display panel and generate a flicker index based on a change in luminance of the display panel determined based on the one or more images;

a driver integrated circuit; and a computing device configured to:

store a plurality of scenarios in a memory, output the bias voltage control signal, receive the flicker index, calculate the change in the flicker index based on a change in the level of the bias voltage, change and output the bias voltage control signal according to one of the plurality of scenarios, based on the change of the calculated flicker index, fit a quadratic function based on the level of the bias voltage and the flicker index corresponding to the level of the bias voltage, and record, to the driver integrated circuit, a level of the bias voltage which corresponds to a minimum value in the quadratic function fitted by the computing device, wherein:

the voltage controller outputs the bias voltage according to a first level and outputs the bias voltage according to a second level, based on the bias voltage control signal, and the computing device selects one of the plurality of scenarios based on the change in the flicker index, and, based on the selected scenario, changes and outputs the bias voltage control signal such that the bias voltage is applied to the display panel according to a third level.

11. The system of claim 10, wherein:

the computing device receives a first flicker index corresponding to the bias voltage output according to the first level and a second flicker index corresponding to the bias voltage output according to the second level from the luminance meter, and the computing device calculates the change in the flicker index based on the change in the level of the bias voltage, based on the bias voltages according to the first level and the second level, the first flicker index, and the second flicker index.

12. The system of claim 11, wherein:

if a third flicker index corresponding to applying the bias voltage according to the third level is a value between the first flicker index and the second flicker index, the computing device fits the quadratic function based only on the bias voltages at the first level to the third level and the first flicker index to the third flicker index.

13. The system of claim 11, wherein:

if the flicker index increases as the level of the bias voltage increases, the computing device outputs the bias voltage control signal to control the voltage controller to apply the bias voltage to the display panel according to the third level, which is smaller than the bias voltages according to the first level and the second level, based on a first scenario of the plurality of scenarios.

14. The system of claim 11, wherein:

if the flicker index decreases as the level of the bias voltage increases, the computing device outputs the bias voltage control signal to control the voltage controller to apply the bias voltage to the display panel according to the third level, which is greater than the bias voltages according to the first level and the second level, based on a second scenario of the plurality of scenarios.

15. The system of claim 14, wherein:

if the third flicker index corresponding to the bias voltage according to the third level is a value smaller than the first flicker index and the second flicker index, the computing device outputs the bias voltage control signal to control the voltage controller to apply the bias voltage according to a fourth level greater than the third level, based on a third scenario of the plurality of scenarios, and the computing device receives a fourth flicker index corresponding to the bias voltage according to the fourth level.

16. The system of claim 15, wherein the computing device fits the quadratic function further based on the bias voltages according to the fourth level and the fourth flicker index.

17. The system of claim 10, wherein:

at least one of the plurality of sub-pixels comprises:

a sub-pixel circuit connected to a first power line to which a first power voltage is applied, and a light emitting element comprising an anode electrode connected to the sub-pixel circuit, a cathode electrode connected to a second power line to which a second power voltage is applied, and a light emitting structure disposed between the anode electrode and the cathode electrode, and the sub-pixel circuit comprises:

a first transistor comprising a first electrode connected to a first node, a gate electrode connected to a second node, and a second electrode connected to a third node, a second transistor comprising a gate electrode connected to a first sub-gate line and configured to switch an electrical connection between the third node and a data line, a third transistor comprising a gate electrode connected to a second sub-gate line and configured to switch an electrical connection between the first node and the second node, a fourth transistor comprising a gate electrode connected to a third sub-gate line and configured to switch an electrical connection between the second node and a third power line to which a first initialization voltage is applied, a fifth transistor configured to switch an electrical connection between the third node and the first power line, a sixth transistor configured to switch an electrical connection between the first node and the anode electrode of the light emitting element, a seventh transistor comprising a gate electrode connected to a fourth sub-gate line and configured to switch an electrical connection between the anode electrode of the light emitting element and a fourth power line to which a second initialization voltage is applied, and an eighth transistor comprising a gate electrode connected to the fourth sub-gate line and configured to switch an electrical connection between the third node and a fifth power line to which the bias voltage is applied.

18. The system of claim 17, wherein:

the first transistor, second transistor, and fifth to eighth transistors are transistors comprising a P-type semiconductor, and the third transistor and the fourth transistor are transistors comprising an N-type semiconductor.

19. The system of claim 17, wherein a gate electrode of each of the fifth transistor and the sixth transistor is connected to one emission control line.

* * * * *